United States Patent [19]
Shindou et al.

[11] Patent Number: 5,396,297
[45] Date of Patent: Mar. 7, 1995

[54] CHARACTER DISPLAY DEVICE FOR DISPLAYING CHARACTERS ON A TELEVISION SCREEN

[75] Inventors: Hiroyasu Shindou; Hiroshi Koyama; Masaya Ohta; Kazumasa Chigira; Shusaku Terawaki, all of Moriguchi, Japan

[73] Assignee: Sanyo Electric Co., Ltd., Osaka, Japan

[21] Appl. No.: 194,695

[22] Filed: Feb. 10, 1994

[30] Foreign Application Priority Data

Feb. 10, 1993 [JP] Japan .................. 5-022580

[51] Int. Cl.⁶ .............. H04N 5/445; H04N 5/44; H04N 7/08; H04N 7/087
[52] U.S. Cl. ................ 348/569; 348/476; 348/473; 348/589; 348/468; 345/200; 395/164
[58] Field of Search ........... 348/571, 473, 471, 500, 348/569, 476, 464, 589, 468; 395/164; 345/200; H04N 5/445, 5/44, 7/08, 7/087

[56] References Cited

U.S. PATENT DOCUMENTS

| | | | |
|---|---|---|---|
| 4,475,124 | 10/1984 | Ankeny et al. | 348/569 |
| 4,658,294 | 4/1987 | Park | 348/468 |
| 4,748,504 | 5/1988 | Ikdea et al. | 348/718 |
| 5,294,982 | 3/1982 | Salomon et al. | 348/476 |
| 5,333,016 | 7/1994 | Tsumi | 348/589 |
| 5,339,160 | 8/1994 | Shindou | 348/571 |

*Primary Examiner*—James J. Groody
*Assistant Examiner*—Glenton B. Burgess
*Attorney, Agent, or Firm*—Spensley Horn Jubas & Lubitz

[57] ABSTRACT

Control data indicating the vertical start positions of display characters is written into the locations of a video RAM determined by a common column address and a plurality of column addresses. In each horizontal synchronizing period, all control data is read in sequence from the video RAM and set in sequence in a vertical start position register. A match is found between the contents of the vertical position counter indicating the current vertical position and the contents of the vertical start position register. When they match, after the horizontal synchronizing period, the video RAM is accessed with the control data as the vertical position start address.

4 Claims, 3 Drawing Sheets

CHARACTER DISPLAY DEVICE FOR DISPLAYING CHARACTERS ON A TELEVISION SCREEN

BACKGROUND OF THE INVENTION

1. Field of the Invention

This invention relates to a character display device having a so-called on-screen function for displaying characters on a television screen.

2. Description of the Related Art

In recent years, in the United States of America, televisions having the function of displaying a conversation, an announcement, or the like on television with a caption on a screen in real time, and when image information stored on record media, such as magnetic tape or magnetic disk, is reproduced, displaying a conversation in the image information with a caption on the screen have been put into commercial products for persons who have hearing difficulties. The user can select a caption display method as he or she desires. This function is called a closed caption function. The system for providing the closed caption function resembles multiplexed text broadcasting in Japan. Caption data for image information transmitted from a broadcasting station or reproduced from record media is carried in a specified horizontal scanning period (21H horizontal line) within a vertical blanking interval in the television signals. The caption data is decoded by the closed caption function, thereby displaying captions on the television screen.

The circuitry for providing the closed caption function is put into an IC which is contained in a television. The IC contains a video RAM (random access memory), character ROM (read-only memory), and a peripheral circuit for controlling the RAM and ROM, etc., for caption display. For example, the closed caption function provides caption display modes such as a text mode which displays 32-character×16-row information on a full television screen and a caption mode which can display 32-character×4-row information in a desired area of a television screen. When caption data in the text mode is decoded, character codes for 32 characters ×16 rows are generated; when caption data in the caption mode is decoded, character codes for 32 characters×4 rows are generated. The video RAM mentioned above has previously stored therein the character codes and is accessed in order to read them out; it consists of at least 512 (=32×16) locations conforming to the text mode which requires a storage capacity larger than the caption mode. The 512 locations of the video RAM correspond to character display positions of a maximum of 32 characters×16 rows displayed on the television screen on a one-to-one basis. Therefore, the video RAM is accessed according to address signals generated from horizontal and vertical synchronizing signals contained in television signals and a dot clock whose cycle is repeated each time a horizontal scanning line passes through each horizontal dot of the character font. The character ROM mentioned above stores character data of predetermined character fonts (each consisting of m horizontal dots×n vertical dots) that can be displayed on the television screen, and is accessed according to character codes in the video RAM. A dot pattern of m horizontal dots of accessed character data is read for 32 characters in the horizontal direction and then repeated n times in sequence in the vertical direction.

To expand character data in the character ROM to a dot pattern for display on a television screen, it is necessary to detect the vertical start position for character display on the television screen because the horizontal positions for character display on the television screen are fixed. Since the vertical position on the television screen can be detected by counting the number of horizontal scanning lines, in the art a counter having a sufficient number of bits to count the number of horizontal scanning lines of one field and a register having the same number of bits as the counter are provided to detect the vertical position for character display. Specifically, binary data provided by counting the number of horizontal scanning lines to the vertical start position of the character row to be displayed is preset in the register. After the counter is reset by the vertical synchronizing signal, the number of horizontal scanning lines is counted in synchronization with the horizontal synchronizing signal. When the counter contents match the register contents, the binary data in the counter indicating the vertical start position and the binary data indicating the horizontal start position are used as address data for accessing the video RAM.

For example, to display characters on four rows per screen, binary data indicating four vertical start positions is required, and four registers are required to set the binary data. However, if a plurality of separate registers are disposed when the closed caption function is put into an IC, a problem of a large chip size arises. This leads to disadvantage to miniaturization and high integration of a chip having been demanded in recent years.

SUMMARY OF THE INVENTION

It is therefore an object of the invention to provide a device which can reduce the storage capacity of a register required to store data concerning the display start position of display characters for decreasing the chip size.

To these ends, according to the invention, there is provided a character display device for displaying characters on a television screen, comprising:

- display data storage means having locations corresponding to display positions on the television screen for storing character codes of characters displayed on the television screen and locations determined by a common column address and a plurality of row addresses for storing control data indicating vertical start positions of characters;
- a row counter for at least counting from an initial value to final value of the row addresses of the display data storage means in a horizontal synchronizing period during which a signal level changes for synchronization at a horizontal synchronizing signal;
- a vertical position counter being reset by a vertical synchronizing signal for counting in synchronization with the horizontal synchronizing signal;
- a match detection circuit for detecting a match between the control data read from the display data storage means in response to the row address counted at the row counter and the common column address and the contents of the vertical position counter;
- a latch circuit responsive to a match detection output of the match detection circuit for holding the row address counted at the row counter; and a switch output circuit for outputting either the contents of the row counter or the contents of the latch circuit in order to access the location of the storage means in which the control data is stored in response to the row address counted in sequence at the row counter in the horizontal synchronizing period and to access the location of the storage means in which a character code is stored in response to the row address held at the latch circuit in a period other than the horizontal synchronizing period.

The display data storage means has a number of rows corresponding to the maximum number of rows of display characters and a number of columns of adding 1 to the number of display characters on one row.

The storage means has the control data storage area at column address 00 and the character code storage area at column addresses 01 and later.

According to the invention, there is provided a character display device responsive to character data contained in signals for displaying characters on a plurality of rows of a television screen, the display device comprising:
  display data storage means for storing data concerning display characters on a plurality of rows and control data indicating the display start position in the vertical direction of each row of the display characters;
  means for reading the control data stored in the display data storage means in a horizontal synchronizing period during which a signal level changes for synchronization at a horizontal synchronizing signal within one horizontal scanning period;
  a vertical position detection circuit for detecting the vertical position of horizonal scanning from the vertical and horizontal synchronizing signal state;
  a match detection circuit for determining whether or not the detection value of the vertical position detection circuit matches the control data read at the read means; and
  character data read means, upon detection of a match by the match detection means, for starting to read character data on the corresponding row stored in the display data storage means.

According to the invention, control data indicating the vertical start positions of display characters is written into the locations of the display data storage means determined by the common column address and a plurality of column addresses. All control data is read in sequence from the display data storage means in each horizontal synchronizing period for detecting a match with the contents of the vertical position counter indicating the current vertical position. When a match is found between the control data and the counter contents, after the horizontal synchronizing period, the display data storage means is accessed with the control data as the vertical position start address.

According to the invention, even if characters are displayed on a plurality of rows of the television screen, at most only one register which holds the value indicating the vertical start position of each row in synchronization with the display timing needs to be located, thereby enabling miniaturization of the chip size of the microcomputer, thereby also providing an advantage of high integration of the chip.

DESCRIPTION OF THE PREFERRED EMBODIMENTS

Referring now to the accompanying drawings, there are shown preferred embodiments of the invention.

Figure 1:
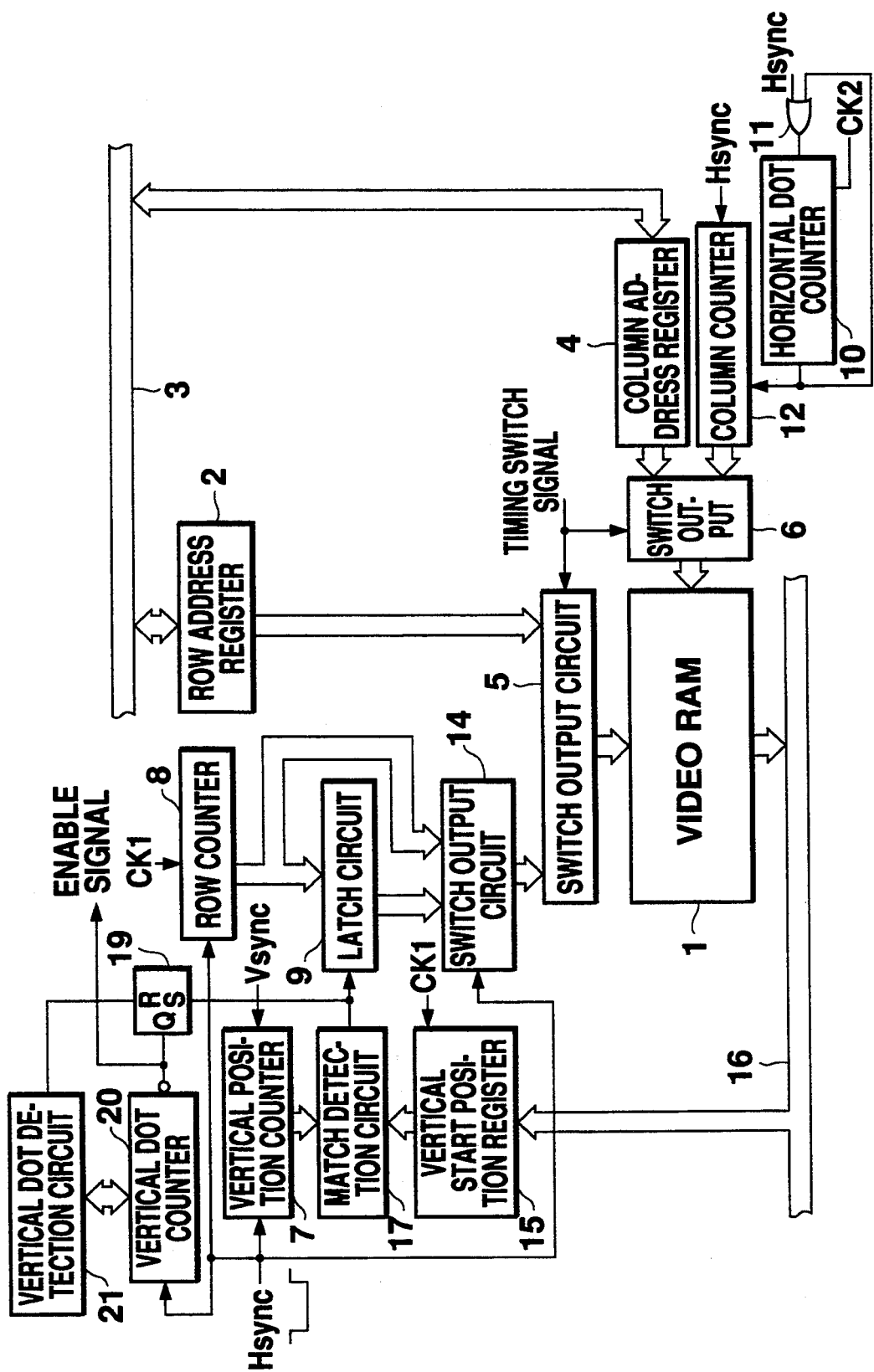
FIG. 1 is a block diagram showing a character display device according to the invention.

FIG. 1 is a block diagram showing a character display device according to the invention. It is assumed that a maximum of 32 characters × 16 rows can be displayed on a television screen (not shown). It is also assumed that the circuitry in FIG. 1 is contained in a microcomputer.

In FIG. 1, numeral 1 is a video RAM which is made of a single port. As described in "Description of the Related Art", the closed caption function provides a text mode and a caption mode for character display. The text mode displays 32 characters × 16 rows on a full television screen and the caption mode displays 32 characters × 4 rows in any desired area of the television screen, either mode of which can be selected by the user as desired. The video RAM 1 is provided to write or read codes such as character codes generated by decoding caption data carried within vertical blanking intervals of television signals in the text mode and caption mode and attribute codes for character qualification. The video RAM 1 has at least 512 (=32 ×16) locations conforming to the text mode which requires a large storage capacity as a storage area concerning display characters themselves, and the locations correspond to character display positions of 32 characters × 16 rows on a one-to-one basis. Therefore, to display characters on the television screen, the storage area of the video RAM 1 concerning the display characters themselves is accessed in synchronization with horizontal scanning and vertical scanning of television signals. On the other hand, the video RAM 1 also has locations where at least control data indicating the vertical start positions of the display characters is stored as a storage area concerning control of the display characters in addition to the above-mentioned storage area concerning the display characters themselves. The control data indicating the vertical start positions of the display characters provides binary counts of horizontal synchronizing signals which should exist at the display start positions in the vertical direction. The control data is accessed in a horizontal synchronizing period as described below. In this embodiment, control data indicating the vertical start position of each row exists, thus the video RAM 1 is made up of 33×16=528 locations.

Figure 2:
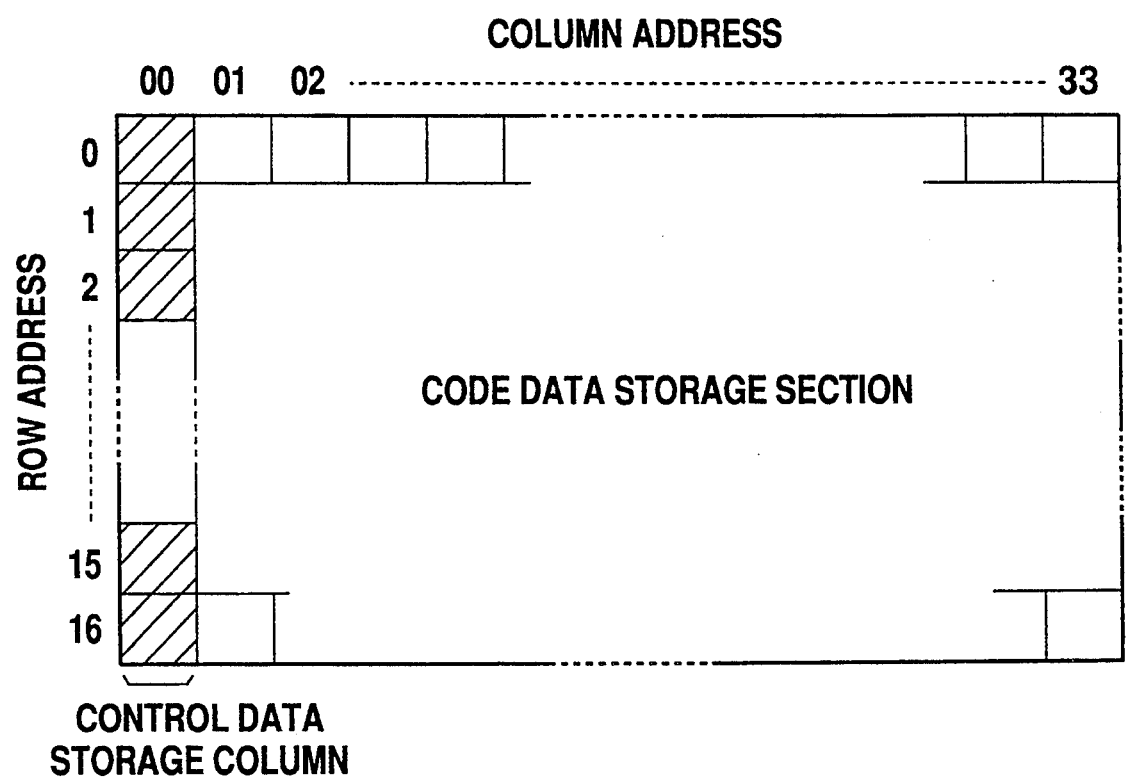
FIG. 2 is an illustration showing the format of a video RAM.

The video RAM 1 has a storage capacity accessed according to row addresses 0H-FH (H: Hexadecimal) and column addresses 00H-21H as shown in FIG. 2; each storage location determined by row and column addresses consists of eight bits. The control data indicating the vertical start positions of display characters is stored in 16 locations determined by the row addresses 0H-FH and the common column address 00H. Character codes and attribute codes are stored in 512 locations determined by row addresses 0F-FH and column addresses 01H-21H. That is, either a character or attribute code is stored in each location. The attribute code exists when an attribute is changed; after this, display determined by the attribute code is made. Each character code is stored as 8-bit data, being any of 00H-7FH and each attribute code is stored as 8-bit data being any of 80H-FFH. Whether the code stored in the video RAM 1 is a character code or attribute code is determined by the most significant bit of the code. The character code read from the video RAM 1 is used for accessing a character ROM (not shown), and the dot pattern data read from the character ROM corresponding to the character code is displayed via a signal processing circuit (not shown) on the television screen. The attribute code read from the video RAM 1 is directly decoded before use for qualification of display characters.

One machine cycle of the microcomputer consists of CPU timing at which write or read operation of the video RAM 1 is performed based on the program decoding result and OSD (On Screen Display) timing at which a read operation of the video RAM 1 is performed independently of the CPU operation. Specifically, one machine cycle is made up of six states of an alternating pattern of a CPU timing state and an OSD timing state. The video RAM 1, which is accessed independently at the CPU timing and the OSD timing, needs only to be a single port of a simple structure. This art is described in Japanese Patent Application No. Hei 4-106608, U.S. Serial No. 08/48,734 by the present applicant.

Numeral 2 is a row address register in which row address data of the video RAM 1 is set via a data bus 3 based on the program decode result. Likewise, numeral 4 is a column address register in which column address data of the video RAM 1 is set via the data bus 3 based on the program decode result. Numerals 5 and 6 are switch output circuits for outputting the set contents of the row address register 2 and the column address register 4 in response to a timing switch signal. The timing switch circuit is a circuit which goes high at the CPU timing and goes low at the OSD timing. When the timing switch signal goes high, the set contents of both the address registers 2 and 4 are input to the video RAM 1 via the switch output circuits 5 and 6, and the location of the video RAM 1 determined by the set contents of both the address registers 2 and 4 is accessed, then control data, character code, attribute code, or the like is written into or read from the location.

Numeral 7 is a vertical position counter which counts data indicating the vertical position on the television screen. After the vertical position counter 7 is reset on the falling edge of a vertical synchronizing signal Vsync, it counts the falling edges of horizontal synchronizing signal Hsync. In the embodiment, the vertical position counter 7 consists of eight bits.

Numeral 8 is a row counter which counts 16 row addresses of the video RAM 1 in a horizonal synchronizing period, namely, while the horizonal synchronizing signal Hsync is low, and consists of four bits corresponding to the number of row addresses. After the row counter 8 is reset on the falling edge of horizontal synchronizing signal Hsync, it counts clocks CK1. The clock CK1 may be any frequency if all row addresses of the video RAM 1 can be counted in the horizontal synchronizing period; in the embodiment, the clock CK1 is set to the same frequency as the timing switch signal. The clock CK1 is gate controlled so as to generate only 16 cycles from just after the falling edge of horizontal synchronizing signal Hsync. Numeral 9 is a latch circuit for holding the contents of the row counter 8 when a match detection signal described below occurs.

Numeral 10 is a horizontal dot counter which counts m horizontal dots of a character font set in the character ROM; an overflow output when horizontal synchronizing signal Hsync or m is counted is input via an OR gate 11 to a reset terminal. That is, after the horizontal dot counter 10 is reset on the falling edge of horizontal synchronizing signal Hsync, it is repeatedly reset by an overflow output occurring each time m clocks CK2 are counted. The clock CK2 is a clock whose cycle (high, low) is repeated each time a horizontal scanning line passes through each horizontal dot. Numeral 12 is a column counter which counts the column address of the video RAM 1; an overflow output of the horizontal dot counter 10 is input to a count terminal. That is, the column counter 12 is reset on the falling edge of horizontal synchronizing signal Hsync in the horizontal synchronizing period and counts overflow outputs of the horizonal dot counter 10 in any period other than the horizontal synchronizing period.

Numeral 14 is a switch output circuit for outputting the contents of the row counter 8 or the contents of the latch circuit 9 in response to horizontal synchronizing signal Hsync. That is, when the timing switch signal is low, if the horizontal synchronizing signal Hsync exists, the contents of the row counter 8 are input to the video RAM 1 via the switch output circuits 14 and 5 and the contents of the column counter 12 are input to the video RAM 1 via the switch output circuit 6. The location of the video RAM 1 determined by the contents of the row counter 8 and column counter 12 is accessed, then control data is read from the location. On the other hand, if the horizontal synchronizing signal Hsync does not exist when the timing switch signal is low, the contents of the latch circuit 9 instead of the contents of the row counter 8 are input to the video RAM 1 via the switch output circuits 14 and 5 and the location of the video RAM 1 determined by the contents of the latch circuit 9 and column counter 12 is accessed, then character data or an attribute code is read from the location.

Numeral 15 is a vertical start position register in which control data indicating 16 vertical start positions read from the video RAM 1 in response to the contents of the row counter 8, 0H-FH, and the contents of the column counter 12, 0H, in the horizontal synchronizing period is set via a data bus 16. The vertical start position register 15 holds only the control data in sequence in response to the clock CK1, and consists of eight bits, like the vertical position counter 7, with the most significant bit fixed to 0. Numeral 17 is a match detection circuit which determines whether or not the vertical position, when predetermined horizontal scanning is performed, is the vertical start position of character display. The match detection circuit 17 compares the contents of the vertical position counter 7 with the contents of the vertical start position register 15, and when they match, generates a match detection signal described above. When the match detection signal is input, the latch circuit 9 holds the contents of the row counter 8 corresponding to the contents of the vertical start position register 15.

Data, codes, etc., read at OSD and CPU timings are mixed in the read contents of the video RAM 1. Then, the vertical start position register 15 provided only for detecting the vertical start positions of display characters may be omitted by locating a latch circuit (not shown) between the read side of the video RAM 1 and the data bus 16 so that the latch circuit can hold various data read from the video RAM 1 at the OSD timing and by enabling the match detection circuit 17 to perform match detection operation on the falling edge of the clock CK1.

Numeral 19 is an RS flip-flop which is set by the match detection circuit. Numeral 20 is a vertical dot counter which counts n vertical dots of character font. After reset is released by a set output of the RS flip-flop 19, the vertical dot counter 20 counts n falling edges of horizontal synchronizing signal Hsync. Numeral 21 is a vertical dot detection circuit which detects the vertical dot counter 20 counting binary data of n and generates a detection signal which is high. The RS flip-flop 19 is reset by the high detection signal, resetting the vertical dot counter 20. That is, an output of the RS flip-flop 19 goes high only until character display on one row terminates from detection of vertical start position; it is used as an enable signal for character display on the television screen.

Figure 3:
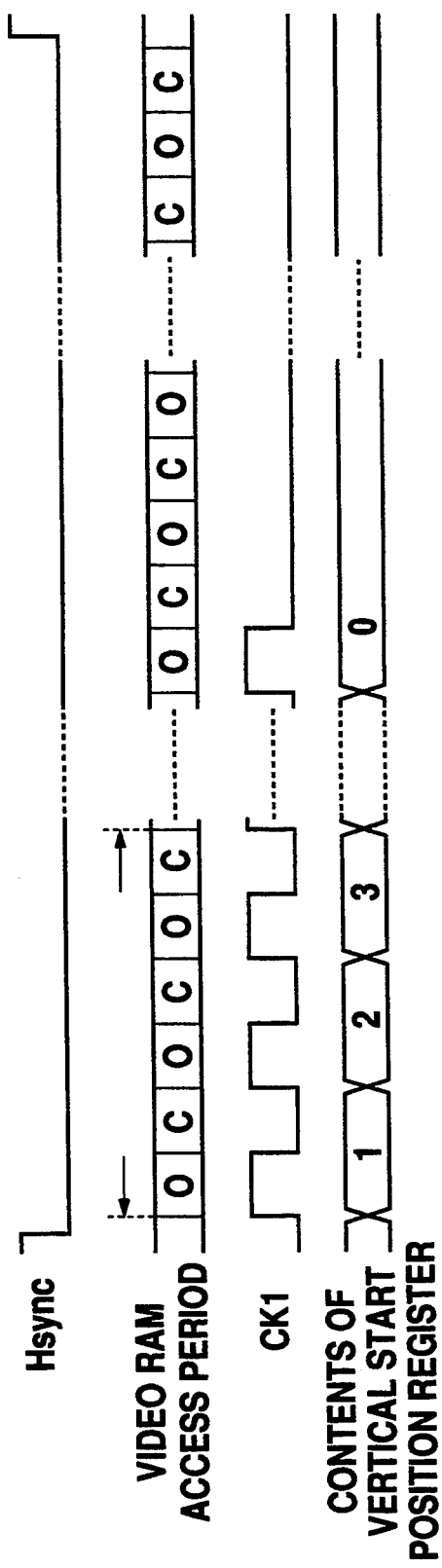
FIG. 3 is a timing chart showing waveforms of main parts in FIG. 1.

The operation of the circuitry in FIG. 1 described above is discussed with reference to the timing chart of FIG. 3. In FIG. 3, "0" and "C" described in the video RAM access period denote OSD timing and CPU timing respectively and "1," "2," "3," . . . described in the contents of vertical start position register denote locations of the video RAM 1 determined in sequence by the row addresses 0H-FH and the column address 0H. Assume that character codes, attribute codes, control data etc., indicating the vertical start positions and size of display characters are previously written via the data bus 3 into the video RAM 1 at the CPU timing of predetermined machine cycles before horizontal synchronizing signal Hsync is generated.

First, when vertical synchronizing signal Vsync falls, the vertical position counter 7 is reset. After this, when the first pulse of horizontal synchronizing signal Hsync falls, the vertical position counter 7 starts counting and the count becomes 001H and the row counter 8 and the column counter 12 are reset. The row counter 8 starts counting 16 cycles of clock CK1 occurring from just after the falling edge of the horizontal synchronizing signal Hsync. While the horizontal synchronizing signal Hsync is low, the contents of the row counter 8 are output via the switch output circuit 14. Thus, control data for 16 vertical start positions read from the video RAM 1 in response to the count of the row counter 8, 0H-FH, and the count of the column counter 12, 0H, is set in the vertical start position register 15 in sequence at each OSD timing in the horizontal synchronizing period. Then, the contents of the vertical position counter 7 are compared with the contents of the vertical start position register 15. If no match detection signal is generated, again the value of the vertical position counter 7 counting the next falling edge of horizonal synchronizing signal Hsync, 002H, is compared with the value of the vertical start position register 15 by the match detection circuit 17.

This operation is repeated. When the count of the vertical position counter 7 matches any one of 16 control data pieces set in sequence in the vertical start position register 15 in one horizontal synchronizing period, a high match detection signal is output from the match detection circuit 17, and the value of the row counter 8 at the time is held in the latch circuit 9. Because of the horizontal synchronizing period, the contents of the latch circuit 9 are not output from the switch output circuit 14. On the other hand, until the RS flip-flop 19 is set by the match detection signal and the vertical dot counter 20 counts binary data of n, character display on the television screen is enabled. The locations of the video RAM 1 each determined by the row address fixed in the latch circuit 9 and the column address counted by the column counter 12 are accessed at OSD timings from the instant at which the horizontal synchronizing signal Hsync goes high to n horizontal scanning lines terminating scanning, and 1-row character dot patterns indicated by the character codes and attribute codes read from the locations are displayed at the horizontal scanning positions mentioned above. The operation is repeated each time the vertical start position of display character is detected.

In the embodiment, the video RAM 1 is provided with the storage area into which the control data indicating the vertical start positions of display characters is written, but the video RAM 1 may be provided with another storage area into which control data indicating the display character size is written so that both types of control data are read from the video RAM 1 in each horizontal scanning period to control the display characters.

Thus, even if characters are displayed on a plurality of rows of the television screen, only one vertical start position register 15 in which the value indicating the vertical start position of each row is set needs to be located, thereby enabling miniaturization of the chip size of the microcomputer. Actually, as compared with the conventional case in which a plurality of registers are provided to set the value indicating the vertical start position, the embodiment of the invention, in which only one register is located to set the value indicating the vertical start position and the storage capacity of the video RAM 1 is somewhat increased, enables the chip area required for the purpose to be reduced to about a quarter.

What is claimed is:

1. A character display device for displaying characters on a television screen, comprising display data storage means having locations corresponding to display positions on the television screen for storing character codes of characters displayed on the television screen and locations determined by a common column address and a plurality of row addresses for storing control data indicating vertical start positions of characters;

a row counter for at least counting from an initial value to a final value of the row addresses of said display data storage means in a horizontal synchronizing period during which a signal level changes for synchronization at a horizontal synchronizing signal;

a vertical position counter being reset by a vertical synchronizing signal for counting in synchronization with the horizontal synchronizing signal;

a match detection circuit for detecting a match between the control data read from said display data storage means in response to the row address counted at said row counter and the common column address and contents of said vertical position counter;

a latch circuit responsive to a match detection output of said match detection circuit for holding the row address counted at said row counter; and a switch output circuit for outputting either contents of said row counter or contents of said latch circuit in order to access the location of said storage means in which the control data is stored in response to the row address counted in sequence at said row counter in the horizontal synchronizing period and to access the location of said storage means in which character code is stored in response to the row address held at said latch circuit in a period other than the horizontal synchronizing period.

2. The character display device as claimed in claim 1 wherein said display data storage means has a number of rows corresponding to the maximum number of rows of display characters and a number of columns one more than the number of display characters on one row.

3. The character display device as claimed in claim 2 wherein said storage means has the control data storage area at column address 00 and the character code storage area at column addresses 01 and later.

4. A character display device responsive to character data contained in signals for displaying characters on a plurality of rows of a television screen, said display device comprising:

display data storage means for storing data concerning display characters on a plurality of rows and control data indicating a display start position in a vertical direction of each row of the display characters;

means for reading the control data stored in said display data storage means in a horizontal synchronizing period during which a signal level changes for synchronization at a horizontal synchronizing signal within one horizontal scanning period;

a vertical position detection circuit for detecting a vertical position of horizonal scanning from vertical and horizontal synchronizing signal states;

a match detection circuit for determining whether or not a detection value of said vertical position detection circuit matches the control data read at said read means; and character data read means, upon detection of a match by said match detection means, for starting to read character data on the corresponding row stored in said display data storage means.

* * * * *